US008380601B2

(12) United States Patent
Bax et al.

(10) Patent No.: US 8,380,601 B2
(45) Date of Patent: Feb. 19, 2013

(54) SYSTEM FOR AND METHOD OF INTERNATIONAL POOLING

(75) Inventors: Matthew Bax, London (GB); Gary Plummer, Poole (GB); Nitin Babbar, Sheffield (GB); Andy Hill, legal representative, Sheffield (GB); Danielle Rumore, Glenwood Landing, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 303 days.

(21) Appl. No.: 12/761,897

(22) Filed: Apr. 16, 2010

(65) Prior Publication Data

US 2011/0060699 A1 Mar. 10, 2011

Related U.S. Application Data

(63) Continuation of application No. 12/550,891, filed on Aug. 31, 2009, now abandoned.

(60) Provisional application No. 61/093,215, filed on Aug. 29, 2008.

(51) Int. Cl.
*G06Q 40/00* (2006.01)

(52) U.S. Cl. .......... 705/36 T; 705/35; 705/36 R

(58) Field of Classification Search ........... 705/36 R, 705/36 T
See application file for complete search history.

(56) References Cited

U.S. PATENT DOCUMENTS

| | | | |
|---|---|---|---|
| 4,953,085 A | 8/1990 | Atkins | |
| 5,517,406 A | 5/1996 | Harris et al. | |
| 5,631,828 A | 5/1997 | Hagan | |
| 5,644,727 A | 7/1997 | Atkins | |
| 5,784,696 A | 7/1998 | Melnikoff | |
| 5,806,047 A | 9/1998 | Hackel et al. | |
| 5,806,048 A | 9/1998 | Kiron et al. | |
| 5,852,811 A | 12/1998 | Atkins | |
| 5,864,828 A | 1/1999 | Atkins | |
| 5,875,437 A | 2/1999 | Atkins | |
| 5,884,285 A | 3/1999 | Atkins | |
| 5,911,135 A | 6/1999 | Atkins | |
| 5,911,136 A | 6/1999 | Atkins | |
| 5,918,218 A | 6/1999 | Harris et al. | |
| 5,926,792 A | 7/1999 | Koppes et al. | |
| 5,987,435 A | 11/1999 | Weiss et al. | |
| 5,999,917 A | 12/1999 | Facciani et al. | |
| 6,018,714 A | 1/2000 | Risen, Jr. et al. | |
| 6,073,104 A | 6/2000 | Field | |
| 6,088,685 A | 7/2000 | Kiron et al. | |
| 6,154,732 A | 11/2000 | Tarbox | |
| 6,236,972 B1 | 5/2001 | Shkedy | |
| 6,321,212 B1 | 11/2001 | Lange | |
| 6,411,939 B1 | 6/2002 | Parsons | |
| 6,442,533 B1 | 8/2002 | Hinkle | |
| 6,598,028 B1 | 7/2003 | Sullivan et al. | |
| 6,985,880 B1 | 1/2006 | Hodgdon et al. | |
| 7,249,037 B2 | 7/2007 | Koppes et al. | |
| 7,249,077 B2 | 7/2007 | Williams et al. | |
| 7,593,881 B2 | 9/2009 | Winklevoss et al. | |
| 7,627,520 B2 | 12/2009 | Wilson et al. | |
| 7,653,560 B2 | 1/2010 | Hueler | |
| 2002/0013751 A1 | 1/2002 | Facciani et al. | |
| 2002/0019793 A1 | 2/2002 | Frattalone | |

(Continued)

*Primary Examiner* — James Vezeris
(74) *Attorney, Agent, or Firm* — Hunton & Williams LLP

(57) ABSTRACT

A system for and method of tracking a loan from a pool of assets is presented. The pool of assets may be legally owned by a single entity, but with separate individual investors owning an economic beneficial interest in a portion of the pool. The system and method provide a technique that allows for tax transparency for income generated by loans of such individual investor's associated assets. Moreover, the system and method allow for the separate individual investors to be domiciled in different tax jurisdictions.

14 Claims, 2 Drawing Sheets

U.S. PATENT DOCUMENTS

| | | |
|---|---|---|
| 2002/0099640 A1 | 7/2002 | Lange |
| 2002/0107770 A1 | 8/2002 | Meyer et al. |
| 2002/0198797 A1 | 12/2002 | Cooper et al. |
| 2002/0198817 A1 | 12/2002 | Dhir |
| 2002/0198833 A1 | 12/2002 | Wohlstadter |
| 2003/0014343 A1 | 1/2003 | Jones |
| 2003/0018557 A1 | 1/2003 | Gilbert et al. |
| 2003/0028466 A1 | 2/2003 | Jenson |
| 2003/0078815 A1 | 4/2003 | Parsons |
| 2003/0101119 A1 | 5/2003 | Parsons et al. |
| 2003/0225662 A1 | 12/2003 | Horan et al. |
| 2003/0225663 A1 | 12/2003 | Horan |
| 2004/0243498 A1 | 12/2004 | Duke |
| 2004/0267651 A1 | 12/2004 | Jenson |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0060254 A1 | 3/2005 | Jones |
| 2005/0071265 A1 | 3/2005 | Nishimaki |
| 2005/0080704 A1 | 4/2005 | Erlach et al. |
| 2005/0251475 A1 | 11/2005 | Sato |
| 2007/0288341 A1* | 12/2007 | Shapack .................... 705/36 R |

* cited by examiner

SYSTEM FOR AND METHOD OF INTERNATIONAL POOLING

CROSS-REFERENCE TO RELATED APPLICATION

This application is a continuation of U.S. application Ser. No. 12/550,891, filed Aug. 31, 2009, which claims priority to U.S. Provisional Patent Application No. 61/093,215 to Bax et al., filed Aug. 29, 2008. U.S. Provisional Patent Application No. 61/093,215 is hereby incorporated by reference in its entirety.

FIELD OF THE INVENTION

The present invention generally relates to a system for and method of administering a pool of assets. More particularly, the present invention generally relates to a system for and method of administering a pool of assets while tracking economic beneficial ownership.

BACKGROUND OF THE INVENTION

Pools of assets having multiple investors domiciled in different tax jurisdictions may participate in securities lending. However, the tax consequences of such lending requires calculating a blended tax rate according to the multiple tax jurisdictions. The prior art does not provide an effective technique whereby an individual investor in a collective pool of assets may participate in securities lending while maintaining an individualized tax treatment of the income resulting from such lending.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF CERTAIN EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Certain embodiments of the present invention allow an entity such as a financial institution to administer a pool of assets such that investment decisions in the pool may be handled by one or more fund managers while providing for the investors in the pool to individually loan out a portion of their share of the assets in a tax transparent manner.

Stepping back, in general, an owner of a portion of assets in a pool may obtain income by redeeming or loaning out all or a portion of such assets. The loan may be to an entity such as a financial institution. For loans, at the end of the loan period, the recipient of the assets must typically return the assets together with a fee from the borrower and any manufactured income payments that have occurred to the stock while out on loan. This revenue is generally taxed as income by the nation in which the loaning entity is domiciled. Note that different countries may tax income derived from asset loans in different manners or with different tax rates.

Figure 1:
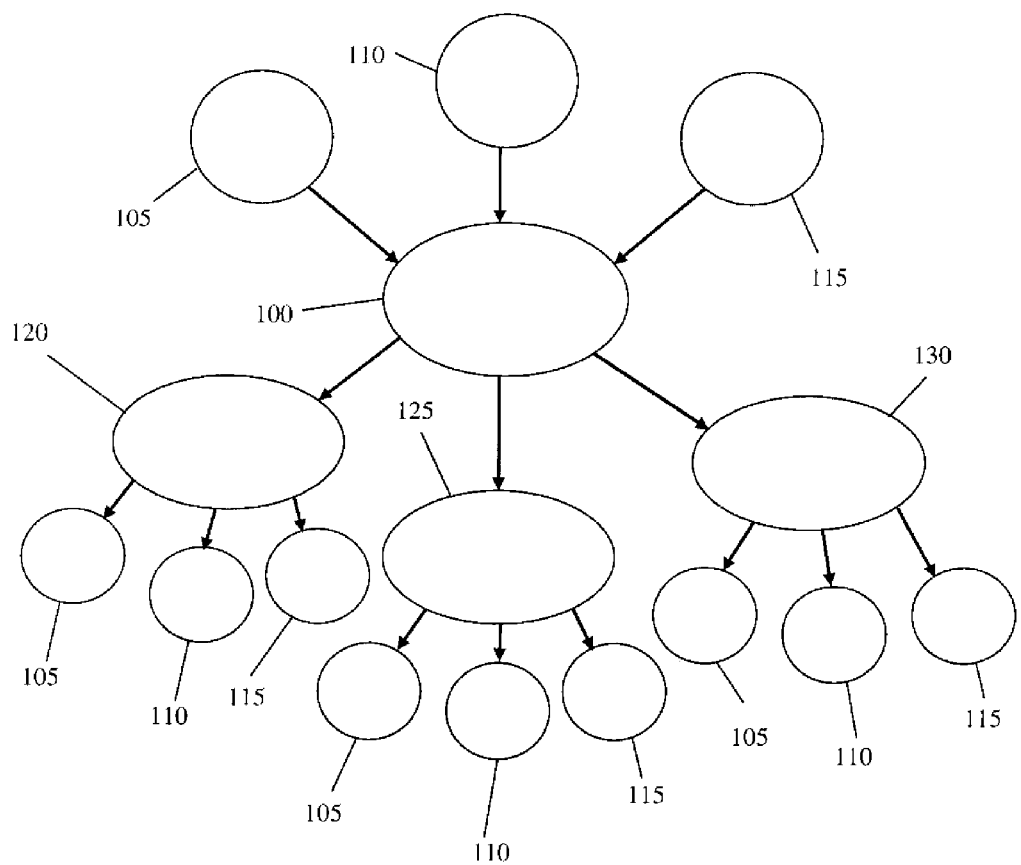
FIG. 1 is a schematic diagram illustrating an international pooling arrangement according to a particular embodiment of the present invention.

FIG. 1 is a schematic diagram illustrating an international pooling arrangement according to a particular embodiment of the present invention. A pool of assets 100 may be managed by one or more fund managers 120, 125, 130. Pools of assets 100 may include, for example, one, or a combination, of mutual funds, pension funds and hedge funds. A number of entities may each own a portion of pool of assets 100. However, investment decisions for the pool may be made by fund manager 120, 125, 130, who may or may not own a portion of the assets in asset pool 100.

Fund managers 120, 125, 130 may make investment decisions regarding the composition of asset pool 100. In FIG. 1, arrows between asset pool 100 and fund managers 120, 125, 130 indicate investment control. For example, fund managers 120, 125, 130 may decide to sell some of the assets in asset pool 100 and re-invest the money in other assets, which are added to asset pool 100. Fund managers 120, 125, 130 may each control a portion of asset pool 100. Administratively, each fund manager 120, 125, 130 may have a separate custody account. In summary, fund managers are responsible for investing a pool's assets, carrying out the pool's investment strategy, and administering the day-to-day trading of the assets in the pool.

Certain embodiments of the present invention provide for pool of assets 100 to be administered by one or more fund managers 120, 125, 130 while allowing the individual investors to loan out some or all of their assets while preserving the investors' individual tax consequences of the revenue received on such loans. Thus, in some embodiments, asset pool 100 is a tax transparent investment vehicle that allows the individual owners to accentuate their investment potential by lending their portion of the pool's assets. This may be achieved at least partially by the use of an administrative and at least partially computer-implemented construct that will be referred to herein as an economic beneficial owner, or "EBO." FIG. 1 depicts three EBOs 105, 110, 115.

In the embodiment of FIG. 1, each owner of a share of asset pool 100 is identified with an EBO 105, 110, 115. Accordingly, arrows between asset pool 100 and EBOs 105, 110 and 115 indicate economic beneficial ownership, which may be in the form of a simple subscription arrangement, by way of non-limiting example.

The owners of portions of asset pool 100 (and associated EBOs) may be different entities located in different countries. For example, a multinational company may include many different national companies. While each national company is at least nominally independent, the multinational company may wish to pool its pension plan asset pool from among the various national companies. This has, among other advantages, economies of scale. Thus, each national company (and associated EBO) may be an owner of a portion of pool 100.

In the embodiment of FIG. 1, each EBO 105, 110, 115 owns a percentage of asset pool 100 based on its contribution over time, calculated as a proportion of the net asset value ("NAV") of asset pool 100. Note that each EBO 105, 110, 115 retains an undivided interest in the legal ownership of asset pool 100, while also maintaining a divided beneficial owner entitlement to the assets, effectively resulting in each EBO's share as being treated as discrete for purposes of, for example, dividend or interest income entitlement, asset lending and taxation.

FIG. 1 depicts that each EBO 105, 110, 115 associated with asset pool 100 has the same percentage ownership within each custody account of fund managers 120, 125, 130 as it has in asset pool 100. This is reflected in FIG. 1 by the arrows between each fund manager 120, 125, 130 and EBOs 105, 110, 115. Thus, for example, if EBO 105 has a 30% ownership in asset pool 100, then EBO 105 will also have a 30% interest in each custody account of each fund manager 120, 125, 130.

Each EBO 105, 110, 115 may choose to participate in agent lending of some or all of its pool assets. The revenue associated with such loans is attributed to the participant EBO rather than generically across all members of the pool. Unlike, for example, a mutual fund, taxation of income (e.g., loan fees and manufactured income) derived from asset pool 100 is administered at the level of EBOs 105, 110, 115. Other asset servicing, such as activities typically performed by fund managers 120, 125, 130, may be at the level of asset pool 100. In some embodiments, the pool may allow for certain asset servicing functions (such as the administration of proxy voting or corporate events) to be handled at the pool level only—thus resulting in no "look through" to the EBO level.

Asset pool 100 may be, by way of non-limiting example, a single Dutch Fonds voor Gemene Reekeningl, referred to herein as "FGR." An FGR may be treated as a distinct legal entity. For embodiments in which asset pool is an FGR, the depository (Stichting Bewaar) is the legal owner of the assets in the pool. In such embodiments, the depository may control lending parameters such as acceptable collateral types, lending limits, cash reinvestment guidelines, and agent lending disclosures. Asset pool 100, though managed by fund managers 120, 125, 130, may be administered by a global custodian. In some embodiments, each fund manager oversees a percentage of the pool as specified by the management company of the FGR, broken down at equivalent percentages within each EBO. Asset pool 100 may take the form of, by way of non-limiting example, an insurance fund or pension fund. Asset pool 100 may be an international fund, in the sense that owners of portions of the pool (identified with EBOs) may reside in different countries.

Figure 2:
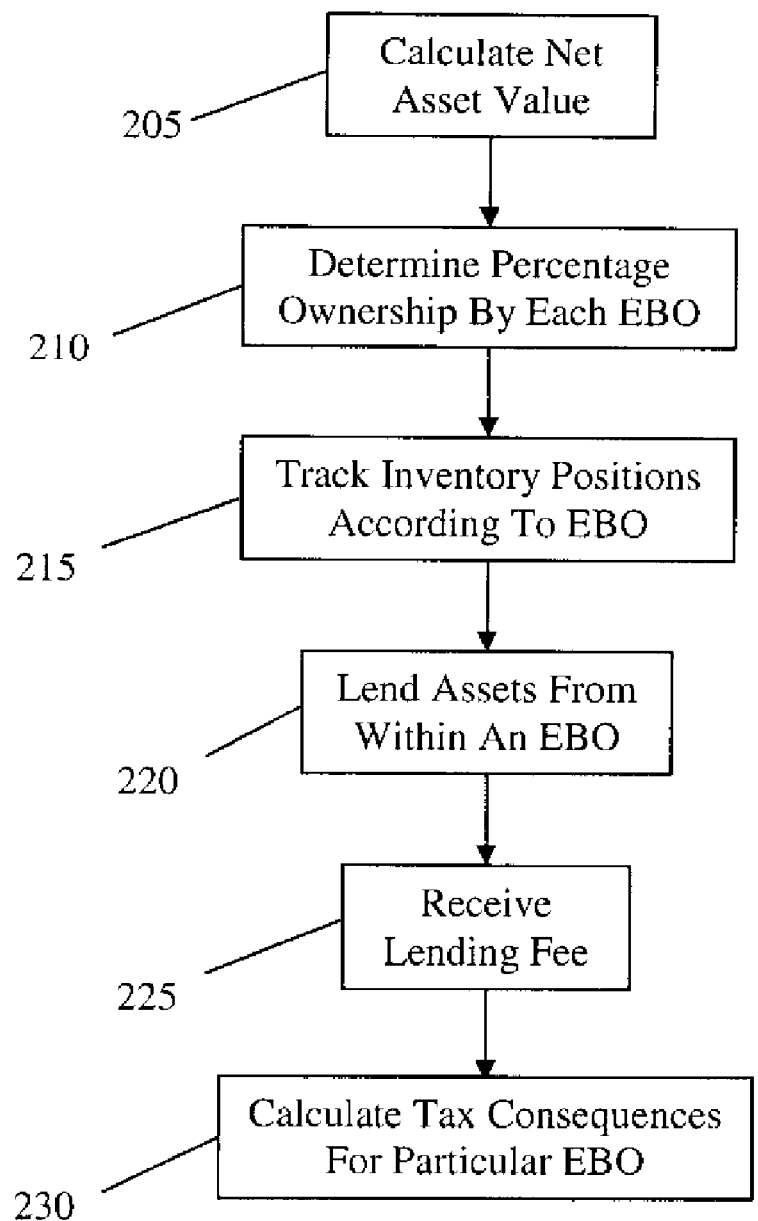
FIG. 2 is flowchart illustrating an exemplary embodiment of the present invention.

FIG. 2 is flowchart illustrating an exemplary embodiment of the present invention. In particular, FIG. 11 illustrates how certain embodiments of the present invention may allow an individual EBO to loan out a portion of its assets and handle the tax consequences according to that EBO's country of domicile.

At block 205, the net asset value of the asset pool is calculated. This calculation may be performed by a fund accounting department or a different entity. Techniques for calculating net asset values of pools of assets are known in the art. The particular calculation for block 210 may involve accounting for money entering the pool (e.g., subscriptions) and exiting the pool (e.g., redemptions). The calculation may occur based on the end-of-day asset prices for the day prior to the calculation.

At block 210, the percentage ownership of each EBO in the asset pool is calculated, based on the result of block 205. Individual EBO percentage beneficial ownership of the asset pool may be calculated on a daily basis. Further, a five-day look-ahead may be implemented to track individual EBO beneficial ownership in the asset pool, including, for example, their respective subscriptions and redemptions. Each such calculation determines not just the percentage beneficial ownership of each EBO for that day, but also the percentage beneficial ownership of each EBO for the next five days, taking into account anticipated changes. On Monday, for example, the percentage beneficial ownership for Monday, Tuesday, Wednesday, Thursday and Friday would be calculated for each EBO. Anticipated changes include, by way of non-limiting example, subscriptions, redemptions and dividends. The five-day look-ahead may be an electronically stored record that is periodically updated as discussed herein.

The following presents a specific example of a block 215 calculation. Consider a pool that consists of 100 shares of the same stock. Consider further a particular EBO that obtains beneficial ownership of twenty-five (25) shares in the pool. On Monday, the embodiment may calculate the percentage of that EBO's beneficial ownership for each day in the week. For purposes of illustration, consider that the particular EBO books a loan of five (5) of its twenty-five (25) shares on Monday. That trade is known to take two days to settle. Thus, the Monday calculation would show that the particular EBO has twenty-five (25) shares available for lending on Monday and Tuesday, but only twenty (20) shares available for lending on Wednesday, Thursday and Friday. Thus, if an agent wishes to book an additional loan of the particular EBO's shares, he or she may consult the five-day look-ahead report and see that the particular EBO will only have twenty (20) shares available as of Wednesday. The agent would then know, on Monday, that he or she could loan at most twenty (20) shares of the particular EBO's stock.

Some embodiments break out EBO percentage beneficial ownership of the pool (block 215) in the following manner. That is, some embodiments inform the trading system of the pool's percentage beneficial ownership per EBO in the following way. Custody may send the inventory to securities lending trading systems periodically, e.g., every three minutes. After the start of the day, custody may take a percentage beneficial ownership from a transfer agency. The periodic inventory may be combined with the transfer agency data and create an electronic inventory file from which trades may be made.

At block 220, assets are lent to a third party from within a particular EBO. In general, lending may be discretionary or directed. "Discretionary lending" here means that the EBO authorizes one or more fund managers to lend that EBO's assets to third parties, at the discretion of the fund manager(s). In some embodiments, each fund manager may only lend an EBO's assets from within that fund manager's custody account. "Directed lending" here means that the EBO itself directs the lending of its assets to third parties.

Whether directed or discretionary, lenders typically consult the five-day look-ahead report to ensure that the assets to be lent will be present when the loan executes. Note that there may be a time delay between when the loan deal is struck and when the loan executes and the assets change custody. Accordingly, the five-day look-ahead report assists in ensuring that only available assets are loaned.

At block 225, a lending fee is received from the third-party debtor. Such a fee may be a flat rate, an interest rate applied to the principle for the loan term, a combination of the preceding, or any other fee arrangement suitable for loans. This fee is generally considered taxable income.

At block 230, the tax consequences of the loan are calculated. In some embodiments, this includes calculating the tax on the income received at block 225 according to the tax code of the country of domicile of the EBO associated with the securities lending. In some embodiments, the income includes any dividends and interest paid on securities while on loan. In some instances, this calculation comprises a simple multiplication by a fixed percentage.

Embodiments of the present invention may be implemented using hardware, firmware, software, or any combination thereof. Standard computer hardware and/or software programming techniques may be used. Any of the calculations described herein may be performed by computer hardware or software. Such computer hardware or software may convey the results of such calculations to a user by way of a user-readable display, or may convey the results to further hardware or software for further processing.

Embodiments, or portions of embodiments, disclosed herein may be in the form of "processing machines," such as general purpose computers, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general purpose computer or computer system. However, the processing machine described above may also utilize any of a wide variety of other technologies including a special purpose computer, a computer system including a microcomputer, mini-computer or mainframe for example, a programmed microprocessor, a microcontroller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. A cluster of personal computers or blades connected via a backplane (network switch) may be used to implement some embodiments.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated, for example, that the processor may be two ore more pieces of equipment in two different physical locations. The two ore more distinct pieces of equipment may be connected in any suitable manner. Additionally, the memory may include two or more portions of memory in two or more physical locations.

To explain further, processing as described above is performed by various components and various memories. However, it is appreciated that the processing performed by two or more distinct components as described above may, in accordance with a further embodiment of the invention, be performed by a single component. Further, the processing performed by one distinct component as described above may be performed by two or more distinct components. In a similar manner, the memory storage performed by two or more distinct memory portions as described above may, in accordance with a further embodiment of the invention, be performed by a single memory portion. Further, the memory storage performed by one distinct memory portion as described above may be performed by two or more memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include Enterprise Control Language ("ECL," available from LexisNexis), assembly language, Ada, APL, C, C++, dBase, Fortran, Java, Modula-2, Pascal, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements an embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In some embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements. Other embodiments, uses, and advantages of the invention will be apparent to those skilled in the art from consideration of the specification and practice of the invention disclosed herein.

We claim:

1. A method for electronically tracking securities lending from a pool of assets, wherein the pool of assets is owned by a plurality of investors each having a separate economic beneficial interest in a portion of the pool of assets, the plurality of investors comprising at least two investor each domiciled in different countries, the method capable of accounting for tax consequences of securities lending by an investor in the pool of assets according to the investor's country of domicile, the method comprising:

using at least one of a plurality of computer processors, electronically calculating a net asset value of the asset pool at least daily;

using at least one of the plurality of computer processors, electronically maintaining records, at least daily, of percentage ownership in a net asset value of the asset pool according to investor;

using at least one of the plurality of computer processors, electronically maintaining records, at least daily, of economic beneficial ownership in the pool of assets according to investor for each of a plurality of days into the future, wherein each economic beneficial ownership comprises a discrete set of assets in the pool of assets associated with a different investor, and wherein each economic beneficial ownership is calculating using a net asset value of the pool and a percentage ownership according to investor;

lending to a third party a portion of an economic beneficial ownership in the asset pool associated with an individual investor;

receiving a fee from the third party associated with the lending; and using at least one of the plurality of computer processors, electronically calculating a tax on the fee, wherein the tax is determined according to a country of domicile of the individual investor.

2. The method of claim 1 wherein the plurality of days is five days.

3. The method of claim 1 wherein the pool of assets comprises a pension fund.

4. The method of claim 1 wherein at least one of the plurality of investors comprises an investment fund.

5. The method of claim 1 wherein the lending is directed lending.

6. The method of claim 1 wherein the lending is discretionary lending.

7. The method of claim 1 wherein a plurality of fund managers manage investment decisions in the pool of assets.

8. A system for electronically tracking securities lending from a pool of assets, wherein the pool of assets is owned by a plurality of investors each having a separate economic beneficial interest in a portion of the pool of assets, the plurality of investors comprising at least two investors each domiciled in different countries, the system capable of accounting for tax consequences of securities lending by an investor in the pool of assets according to the investor's country of domicile, the system comprising:

a computer programmed to electronically calculate a net asset value of the asset pool at least daily;

an electronic database maintaining records, at least daily, of percentage ownership in a net asset value of the asset pool according to investor;

an electronic database maintaining records, at least daily, of economic beneficial ownership in the pool of assets according to investor for each of a plurality of days into the future, wherein each economic beneficial ownership comprises a discrete set of assets in the pool of assets associated with a different investor, and wherein each economic beneficial ownership is calculating using a net asset value of the pool and a percentage ownership according to investor;

an electronic database maintaining a record of lending to a third party a portion of an economic beneficial ownership in the asset pool associated with an individual investor;

an electronic database maintaining a record of receiving a fee from the third party associated with the lending; and a computer programmed to electronically calculate a tax on the fee, wherein the tax is determined according to a country of domicile of the individual investor.

9. The system of claim 8 wherein the plurality of days is five days.

10. The system of claim 8 wherein the pool of assets comprises a pension fund.

11. The system of claim 8 wherein at least one of the plurality of investors comprises an investment fund.

12. The system of claim 8 wherein the lending is directed lending.

13. The system of claim 8 wherein the lending is discretionary lending.

14. The system of claim 8 wherein a plurality of fund managers manage investment decisions in the pool of assets.

* * * * *